United States Patent
Li

(10) Patent No.: US 9,871,553 B2
(45) Date of Patent: Jan. 16, 2018

(54) AUDIO APPARATUS AND AUDIO COMMUNICATION CHANNEL CIRCUIT

(71) Applicant: TENDYRON CORPORATION, Beijing (CN)

(72) Inventor: Dongsheng Li, Beijing (CN)

(73) Assignee: TENDYRON CORPORATION, Beijing (CN)

( * ) Notice: Subject to any disclaimer, the term of this patent is extended or adjusted under 35 U.S.C. 154(b) by 0 days.

(21) Appl. No.: 15/518,380

(22) PCT Filed: Aug. 4, 2015

(86) PCT No.: PCT/CN2015/086024
§ 371 (c)(1),
(2) Date: Apr. 11, 2017

(87) PCT Pub. No.: WO2016/090932
PCT Pub. Date: Jun. 16, 2016

(65) Prior Publication Data
US 2017/0310354 A1    Oct. 26, 2017

(30) Foreign Application Priority Data

Dec. 10, 2014  (CN) .......................... 2014 1 0757010

(51) Int. Cl.
*H03G 3/20* (2006.01)
*H04B 1/401* (2015.01)
(Continued)

(52) U.S. Cl.
CPC ............... *H04B 1/401* (2013.01); *H04R 3/00* (2013.01); *H04R 5/04* (2013.01)

(58) Field of Classification Search
USPC ...... 381/57, 26, 55, 56, 58, 91, 92, 150, 346
See application file for complete search history.

(56) References Cited

U.S. PATENT DOCUMENTS

2011/0091063 A1* 4/2011 Lee ..................... H04R 1/1091
381/384

FOREIGN PATENT DOCUMENTS

CN        202713580         1/2013
CN      20122146835    *    1/2013    ............... H04R 1/10
(Continued)

OTHER PUBLICATIONS

International Searching Authority, Written Opinion of the International Searching Authority for PCT/CN2015/086024 (Sep. 24, 2015).

*Primary Examiner* — Yosef K Laekemariam
(74) *Attorney, Agent, or Firm* — Hodgson Russ LLP

(57) ABSTRACT

Disclosed are audio apparatuses and audio communication channel circuits. The circuit includes an audio connector, an identification circuit, a first and a second audio communication channel. An output terminal of the first channel is connected to one of a first and a second pin, an output terminal of the second channel is connected to the other, a first terminal of the identification circuit is connected to one of the first and second pin, and a second terminal of the identification circuit is connected to the other. The circuit further includes: a first pull-down resistor with a first terminal connected to the first channel and a second terminal connected to ground; and a second pull-down resistor with a first terminal connected to the second channel and a second terminal connected to ground. With the present disclosure, the type of hosts that may be compatible with the audio apparatus is enlarged.

20 Claims, 4 Drawing Sheets

(51) Int. Cl.
*H04R 5/04* (2006.01)
*H04R 3/00* (2006.01)

(56) References Cited

FOREIGN PATENT DOCUMENTS

| | | |
|---|---|---|
| CN | 202979251 | 6/2013 |
| CN | 104507006 | 4/2015 |
| CN | 104519445 | 4/2015 |
| CN | 104640024 | 5/2015 |
| CN | 204347813 | 5/2015 |
| CN | 204350273 | 5/2015 |
| CN | 204423355 | 6/2015 |

\* cited by examiner

US 9,871,553 B2

AUDIO APPARATUS AND AUDIO COMMUNICATION CHANNEL CIRCUIT

CROSS-REFERENCE TO RELATED APPLICATIONS

This application is a U.S. national phase application of International Application Serial No. PCT/CN2015/086024, filed on Aug. 4, 2015, which is based on and claims priority to Chinese Patent Application Serial No. 201410757010.X, filed on Dec. 10, 2014, the entire contents of which are incorporated herein by reference.

FIELD

The present disclosure relates to the field of electronic technology, and more particularly, to an audio apparatus and an audio communication channel circuit.

BACKGROUND

Currently, audio connectors may have three-contact or four-contact. Two different forms may found for the four-contact: International Standard (also see in OMTP, Open Mobile Terminal Platform) four-contact audio connectors and American Standard (also see in CTIA, Cellular Telecommunications Industry Association) four-contact audio connectors. For the International Standard four-contact audio connector, pin (also called as contact) 1 is for a left channel, pin 2 is for a right channel, pin 3 is for a MIC (microphone), and pin 4 is for ground return. While for the American Standard four-contact audio connector, the pins are arranged in a different way: pin 1 is for a left channel (also called as a left channel contact), pin 2 is for a right channel (also called as a right channel contact), pin 3 is for ground return (GND) (also called as a GND contact), and pin 4 is for a microphone (MIC) (also called as a MIC contact). Take an International Standard four-contact earphone plug as an example, a first terminal of a left channel is connected to pin 1, a second terminal of the left channel is connected to pin 4; a first terminal of a right channel is connected to pin 2, a second terminal of the right channel is connected to pin 4; a first terminal of a microphone is connected to pin 3, a second terminal of the microphone is connected to pin 4. Generally, an audio apparatus uses the four-contact audio connector and transmits audio signals to a host connected through a MIC pin, in which, in the audio apparatus, the communication of transmitting the audio signals to the host connected through the MIC pin is called as an audio communication channel FIG. 1 is a circuit structure diagram illustrating an audio communication channel circuit of an audio apparatus in the related art. As shown in FIG. 1, in the related art, in order to make the audio apparatus be compatible with both International Standard audio connector and American Standard audio connector, two channels corresponding to pin 3 and pin 4 respectively in the audio apparatus are totally the same, that is, they both equal to providing an equivalent resistor (i.e. R1 and R2 in FIG. 1). The equivalent resistor is connected to pin 3 or pin 4 through a capacitor, that is, an output terminal of the audio communication channel in the audio apparatus is connected to pin 3 or pin 4 through the capacitor (i.e. C1 and C2 in FIG. 1). When the audio apparatus is inserted into the host, a switch S2 is configured to connect a pin (assuming pin 3) corresponding to a GND contact of the host to ground under effect of an electrical level input from a GFIO (General-Function Input/output Contact). An uploading input audio signal (AUpload1) from the audio apparatus to the host may pass through the output terminals of the two channels (EP_PIN3 and EP_PIN4) and capacitors C1, C2 respectively and reach to pin 3 and pin 4 of an audio interface. The audio signal is output to the host through a pin (shown as pin 4 in FIG. 1) which is connected to a MIC contact of the host. EP_PIN3 and EP_PIN4 are connected to an electronic element (shown as equivalent resistors R1 and R2 in FIG. 1) with high resistance (generally 27KΩ) in series respectively. When an interface (earphone plug) of the audio apparatus is inserted into the host (e.g. a computer or a mobile terminal), the host may identify an identification circuit (Rmic) which is connected EP_PIN3 with EP_PIN4 and achieve a detection of whether the audio connector of the audio apparatus is matching.

In the related art, the audio apparatus usually uses Frequency-shift keying (FSK for short) data. When the audio apparatus communicates with the host, a voltage output by the audio apparatus may vary after connected to the host. The variation amplitude of the voltage output by the audio apparatus may affect the quality of the signal from the audio apparatus to the host. The greater the variation amplitude of the voltage output is, the worse the quality of the signal comes. In the circuit structure shown in FIG. 1, an output terminal of the audio communication channel is connected to pin 4 via a capacitor (C2). When the audio apparatus is inserted into the host, an identification circuit and the host are connected in parallel and then connected to R2 in series on an audio communication channel which is connected to a MIC of the host. Since the resistance value of R2 and the resistance value of the identification circuit are both very high, when the audio apparatus is inserted into the host, the amplitude of the signal from the audio apparatus to the host is determined by the value of the equivalent resistance that the host connected to the audio apparatus. The host with a higher equivalent resistance may correspond to a signal with bigger amplitude; the host with a lower equivalent resistance may correspond to a signal with smaller amplitude. In practical application, there are all kinds of hosts. Some hosts have the low equivalent resistance value when connected to the audio apparatus, while some hosts have the high equivalent resistance value when connected to the audio apparatus. Therefore, the amplitude of the signal from the audio apparatus to the host is uncontrollable. Besides, for those hosts with a too high or too low equivalent resistance value, the amplitude of the signal from the audio apparatus to the host may be too great or too little so that go beyond the identification scope of the host, thus the scope of the host that the audio apparatus may be compatible with is limited.

SUMMARY

According to embodiments of the present disclosure, an audio communication channel circuit is provided. The audio communication channel circuit includes: an audio connector, an identification circuit, a first audio communication channel and a second audio communication channel. An output terminal of the first audio communication channel is connected to one of a first pin and a second pin of the audio connector via a first capacitor, an output terminal of the second audio communication channel is connected to the other one of the first pin and the second pin of the audio connector via a second capacitor, a first terminal of the identification circuit is connected to one of the first pin and the second pin, and a second terminal of the identification circuit is connected to the other one of the first pin and the second pin. The audio communication channel circuit further includes: a first pull-down resistor with a first terminal connected to an output terminal of the first audio communication channel and a second terminal connected to ground; and a second pull-down resistor with a first terminal connected to an output terminal of the second audio communication channel and a second terminal connected to ground. A resistance value of the first pull-down resistor and a resistance value of the second pull-down resistor are in a preset range, the first pin is one of a pin corresponding to a microphone (MIC) contact of a host and a pin corresponding to a ground (GND) contact of the host when the audio apparatus is connected to the host, and the second pin is the other one of the pin corresponding to the MIC contact of the host and the pin corresponding to the GND contact of the host when the audio apparatus is connected to the host.

According to embodiments of the present disclosure, an audio apparatus is provided. The audio apparatus includes aforesaid audio communication channel circuits.

BRIEF DESCRIPTION OF THE DRAWINGS

In order to give a more clearly illustration of technical solutions of embodiments of the present disclosure, the drawings used in descriptions of embodiments are introduced briefly as the followings. Obviously, the drawings described below are only some embodiments of the present disclosure. Those skilled in the art may obtain other drawings according to these drawing without creative labors.

DETAILED DESCRIPTION

Technical solutions of embodiments of the present disclosure will be described clearly and completely hereafter with reference to drawings of embodiments of the present disclosure, obviously, the described embodiments are just part of embodiments of the present disclosure but not all the embodiments. All the other embodiments obtained by those skilled in the art on the basis of embodiments of the present disclosure without creative labors will be within the scope of the present disclosure.

Embodiment 1

Figure 1:
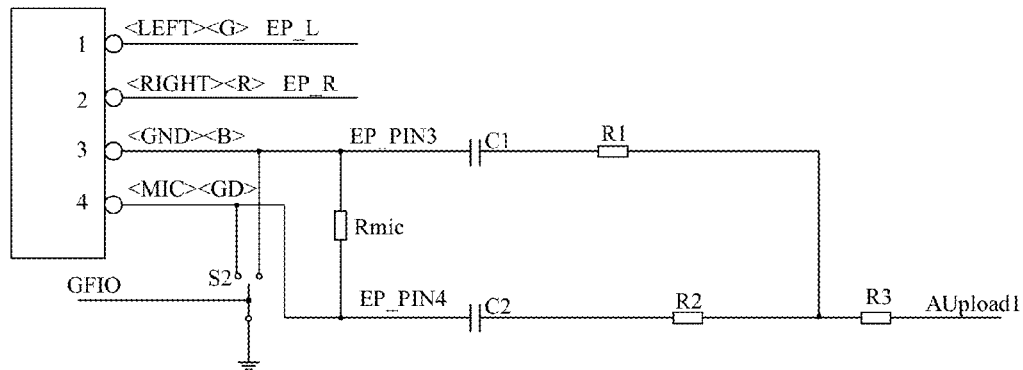
FIG. 1 is a circuit structure diagram illustrating an audio communication channel circuit of an audio apparatus in the related art.
Figure 2:
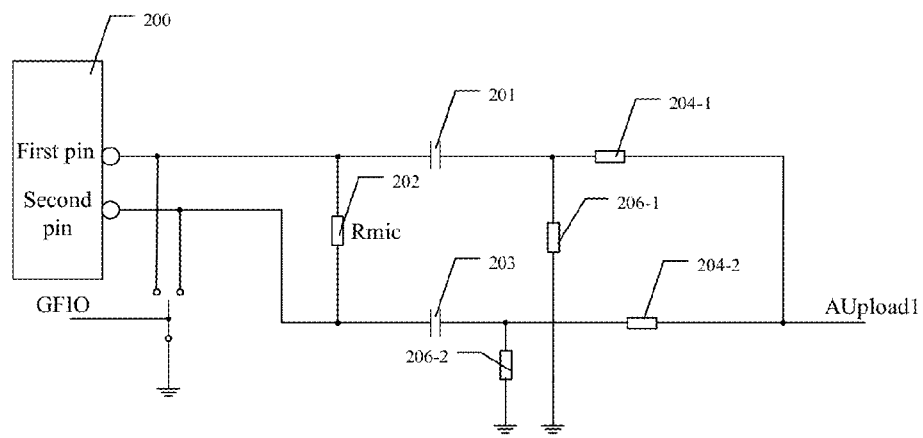
FIG. 2 is a circuit structure diagram illustrating an audio communication channel circuit provided in a first embodiment of the present disclosure.

The present embodiment provides an audio communication channel circuit. FIG. 2 is a circuit structure diagram illustrating an audio communication channel circuit provided in this embodiment.

As shown in FIG. 2, the audio communication channel circuit provided in the present embodiment generally includes: an audio connector 200, an identification circuit 202, a first audio communication channel 204-1 (shown as an equivalent resistor of electronic elements in the first audio communication channel 204-1 in FIG. 2), a second audio communication channel 204-2 (shown as an equivalent resistor of electronic elements in the second audio communication channel 204-2 in FIG. 2), a first pull-down resistor 206-1 and a second pull-down resistor 206-2. A resistance value of the first pull-down resistor 206-1 and a resistance value of the second pull-down resistor 206-2 are in a preset range. An output terminal of the first audio communication channel 204-1 is connected to one of a first pin and a second pin of the audio connector 200 via a first capacitor 201, and an output terminal of the second audio communication channel 204-2 is connected to the other one of the first pin and the second pin of the audio connector 200 via a second capacitor 203 (FIG. 2 only shows for example that the output terminal of the first audio communication channel 204-1 is connected to the first pin of the audio connector 200 via the first capacitor 201, and the output terminal of the second audio communication channel 204-2 is connected to the second pin of the audio connector 200 via the second capacitor 203). A first terminal of the first pull-down resistor 206-1 is connected to the output terminal of the first audio communication channel 204-1, and a second terminal is connected to ground. A first terminal of the second pull-down resistor 206-2 is connected to the output terminal of the second audio communication channel 204-2, and a second terminal is connected to ground. A first terminal of the identification circuit 202 is connected to one of the first pin and the second pin, and a second terminal of the identification circuit 202 is connected to the other one of the first pin and the second pin (i.e. the identification circuit is connected between the first pin and the second pin). The first pin is one of a pin corresponding to a microphone (MIC) contact of a host and a pin corresponding to a ground (GND) contact of the host when the audio apparatus is inserted into the host, and the second pin is the other one of the pin corresponding to the microphone (MIC) contact of the host and the pin corresponding to the ground (GND) contact of the host when the audio apparatus is inserted into the host.

In a process of particular implementation, the first pin may be pin 3 of a four-contact audio connector or may also be pin 4 of a four-contact audio connector. Accordingly, the second pin may be pin 4 of a four-contact audio connector or may also be pin 3 of a four-contact audio connector.

In this embodiment, the first audio communication channel 204-1 and the second audio communication channel 204-2 are configured to transmit FSK coded audio signal from the audio apparatus to the host. The audio signal (AUpload1) is input from input terminals of the first audio communication channel 204-1 and the second audio communication channel 204-2. In practical application, when the audio apparatus is inserted into the host, only audio signals in one of the audio communication channels are transmitted to the host via a pin corresponding to a MIC contact of the host, and the other audio communication channel is connected to ground via a pin corresponding to a GND contact of the host.

Besides, it should be noted that, for convenience, only an equivalent resistor of the identification circuit 202 is shown in the figures but not the specific structure of the identification circuit 202. In practical application, the identification circuit 202 may use a circuit of the audio apparatus in the related art or may be obtained by simple modification of the identification circuit in the related art, as long as it can realize a detection of an earphone when the audio apparatus is inserted into the host, and the specific structure is not limited in embodiments of the present disclosure.

Figure 3:
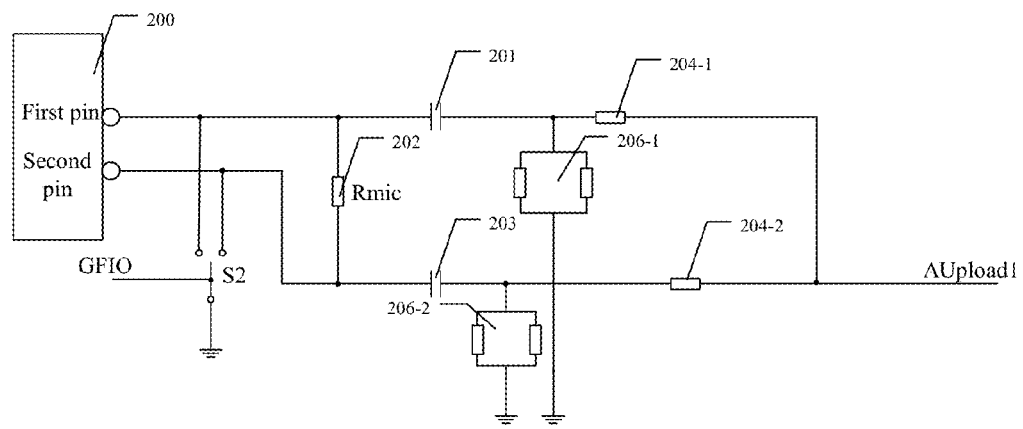
FIG. 3 is a circuit structure diagram illustrating an alternative audio communication channel circuit provided in a first embodiment of the present disclosure.
Figure 4:
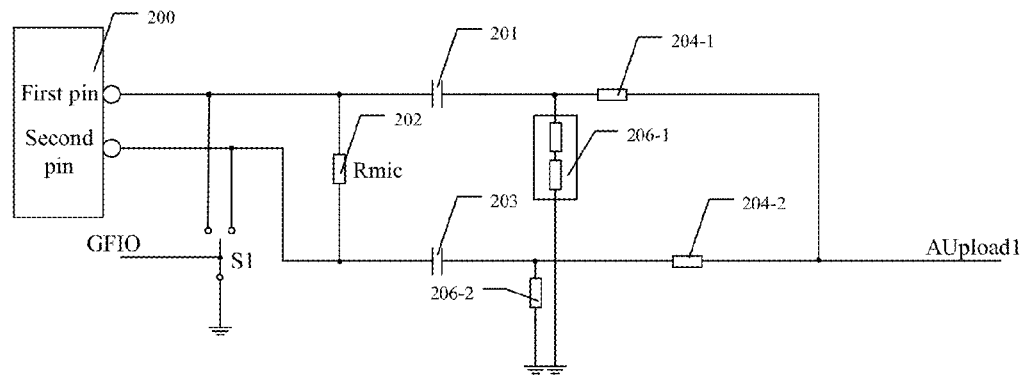
FIG. 4 is a circuit structure diagram illustrating another alternative audio communication channel circuit provided in a first embodiment of the present disclosure.
Figure 5:
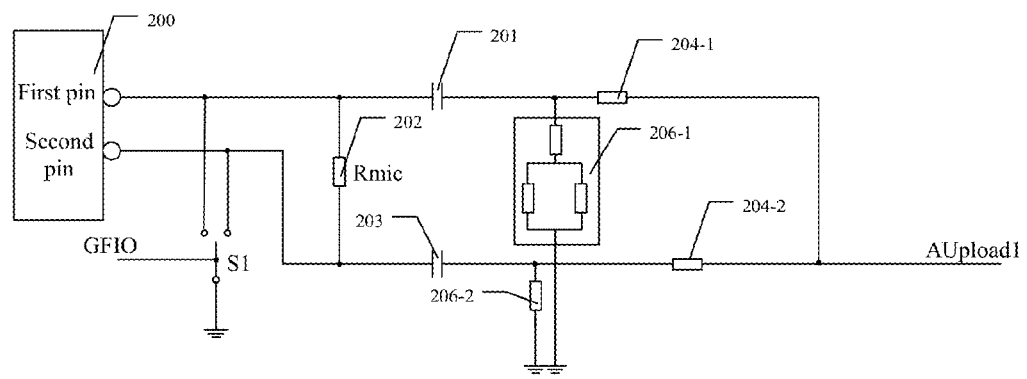
FIG. 5 is a circuit structure diagram illustrating yet another alternative audio communication channel circuit provided in a first embodiment of the present disclosure.

In an alternative implementation of an embodiment of the present disclosure, the first pull-down resistor 206-1 and the second pull-down resistor 206-2 may be one resistor or may include a plurality of resistors connected in parallel (for example, the first pull-down resistor 206-1 and the second pull-down resistor 206-2 shown in FIG. 3 may be two resistors connected in parallel respectively), or may include a plurality of electronic elements connected in series (for example, the first pull-down resistor 206-1 shown in FIG. 4 is two resistors connected in series), or may include a plurality of electronic elements connected in series and in parallel (for example, the first pull-down resistor 206-1 shown in FIG. 5 is that two resistors are connected in parallel and then connect to one resistor in series). Specific implementations are not limited in embodiments of the present disclosure as long as the final equivalent resistor is in the above mentioned preset range.

Alternatively, the aforesaid preset range in embodiments of the present disclosure may be 100~999Ω. Preferably, the preset range is 270~510Ω. In a process of particular implementation, the resistance value of the pull-down resistor 206 may be determined according to a requirement of the final output voltage of the audio apparatus (i.e. the voltage range that can be identified by the host), a resistance value of the identification circuit 202, a resistance value of the electronic elements in the audio communication channel 204, and a voltage value of the signal input terminal of the audio communication channel 204.

For example, assuming that the resistance value of the equivalent resistor in the audio communication channel is 27KΩ, when the audio apparatus is transmitting a signal to the host, the voltage value of the signal input terminal of the audio communication channel is 3.3V, the resistance value of the identification circuit 202 is 10KΩ, and it is the demand that the voltage value range of the signal outputting from the audio apparatus to the host should be 9~120 mV. Taking the pin (corresponding to the first audio communication channel 204-1 which is connected to the first pull-down resistor 206-1) being connected to a MIC contact of the host as an example, then:

(1) If the resistance value of the first pull-down resistor 206-1 is 100Ω, then when the audio apparatus is inserted into the host, the three of the first pull-down resistor 206-1, the identification circuit 202 and the input terminal of the host are connected in parallel, and then connect to the electronic elements in the audio communication channels in series. If the resistance value of the equivalent resistor of the connected host is greater than 100Ω, then the resistance value of the parallel connected three of the first pull-down resistor 206-1, the identification circuit 202 and the input terminal of the host is about 100Ω, and the voltage of the input terminal of the host is Vmic=3.3*(100/(27000+100))≈12 mV. If the resistance value of the equivalent resistor of the connected host is less than 100Ω (assuming 80Ω), then the resistance value of the parallel connected three of the first pull-down resistor 206-1, the identification circuit 202 and the input terminal of the host is about 80Ω, and the voltage of the input terminal of the host is Vmic=3.3*(80/(27000+80))≈9.7 mV. The requirement is satisfied, and the output signals of the audio apparatus can be identified by the host successfully.

(2) If the resistance value of the first pull-down resistor 206-1 is 999Ω, then when the audio apparatus is inserted into the host, the three of the first pull-down resistor 206-1, the identification circuit 202 and the input terminal of the host are connected in parallel, and then connect to the electronic elements in the audio communication channels in series. If the resistance value of the equivalent resistor of the connected host is greater than 999Ω, then the resistance value of the parallel connected three of the first pull-down resistor 206-1, the identification circuit 202 and the input terminal of the host is about 999Ω, and the voltage of the input terminal of the host is Vmic=3.3*(999/(27000+999))≈117.7 mV. If the resistance value of the equivalent resistor of the connected host is less than 999Ω (assuming 150Ω), then the resistance value of the parallel connected three of the first pull-down resistor 206-1, the identification circuit 202 and the input terminal of the host is about 150Ω, and the voltage of the input terminal of the host is Vmic=3.3*(150/(27000+150))≈18 mV. The requirement is satisfied.

(3) If the resistance value of the first pull-down resistor 206-1 is 270Ω, then when the audio apparatus is inserted into the host, the three of the first pull-down resistor 206-1, the identification circuit 202 and the input terminal of the host are connected in parallel, and then connect to the electronic elements in the audio communication channels in series. If the resistance value of the equivalent resistor of the connected host is greater than 270Ω, then the resistance value of the parallel connected three of the first pull-down resistor 206-1, the identification circuit 202 and the input terminal of the host is about 270Ω, and the voltage at the input terminal of the host is Vmic=3.3*(270/(27000+270))≈32 mV. If the resistance value of the equivalent resistor of the connected host is less than 270Ω (assuming 200Ω), then the resistance value of the parallel connected three of the first pull-down resistor 206-1, the identification circuit 202 and the input terminal of the host is about 200Ω, and the voltage of the input terminal of the host is Vmic=3.3*(200/(27000+200))≈24.3 mV. The requirement is satisfied.

(4) If the resistance value of the first pull-down resistor 206-1 is 400Ω, then when the audio apparatus is inserted into the host, the three of the first pull-down resistor 206-1, the identification circuit 202 and the input terminal of the host are connected in parallel, and then connect to the electronic elements in the audio communication channels in series. If the resistance value of the equivalent resistor of the connected host is greater than 400Ω, then the resistance value of the parallel connected three of the first pull-down resistor 206-1, the identification circuit 202 and the input terminal of the host is about 400Ω, and the voltage of the input terminal of the host is Vmic=3.3*(400/(27000+400))≈48.1 mV. If the resistance value of the equivalent resistor of the connected host is less than 400Ω (assuming 200Ω), then the resistance value of the parallel connected three of the first pull-down resistor 206-1, the identification circuit 202 and the input terminal of the host is about 200Ω, and the voltage of the input terminal of the host is Vmic=3.3*(200/(27000+200))≈24.3 mV. The requirement is satisfied.

(5) If the resistance value of the first pull-down resistor 206-1 is 510Ω, then when the audio apparatus is inserted into the host, the three of the first pull-down resistor 206-1, the identification circuit 202 and the input terminal of the host are connected in parallel, and then connect to the electronic elements in the audio communication channels in series. If the resistance value of the equivalent resistor of the connected host is greater than 510Ω, then the resistance value of the parallel connected three of the first pull-down resistor 206-1, the identification circuit 202 and the input terminal of the host is about 510Ω, and the voltage of the input terminal of the host is Vmic=3.3*(510/(27000+ 510))≈61.1 mV. If the resistance value of the equivalent resistor of the connected host is less than 510Ω (assuming 200Ω), then the resistance value of the parallel connected three of the first pull-down resistor 206-1, the identification circuit 202 and the input terminal of the host is about 200Ω, the voltage of the input terminal of the host is Vmic=3.3* (200/(27000+200))≈24.3 mV. The requirement is satisfied.

With the audio communication channel circuit provided in the present embodiment, the resistance value of the output of the audio communication channel may be reduced by connecting the pull-down resistor to the output terminal of the audio communication channel, therefore the amplitude variation may be controlled in a certain range after hosts with different input resistance values are connected. Moreover, since the pull-down resistor is configured on each of the two audio communication channels, the upload data of the audio apparatus may be guaranteed to output normally even the audio apparatus is inserted into hosts with different types of audio interfaces.

Embodiment 2

Using the audio communication channel circuit in embodiment 1, at the moment the audio apparatus is inserted into the host, a conducting circuit is formed between a MIC contact of the host and a ground return via a capacitor 201, a first pull-down resistor 206-1, a second pull-down resistor 206-2 and a capacitor 203. Since the conduct resistance of the electronic element 206-1 and the conduct resistance of the electronic element 206-2 are relatively small, the conducting circuit shows capacitive characteristic. When the audio apparatus is inserted into the host, the detection of an earphone will be affected, thus the identification of the earphone will be affected accordingly. Therefore, the audio communication channel circuit in embodiment 1 is modified in the present embodiment.

Figure 6:
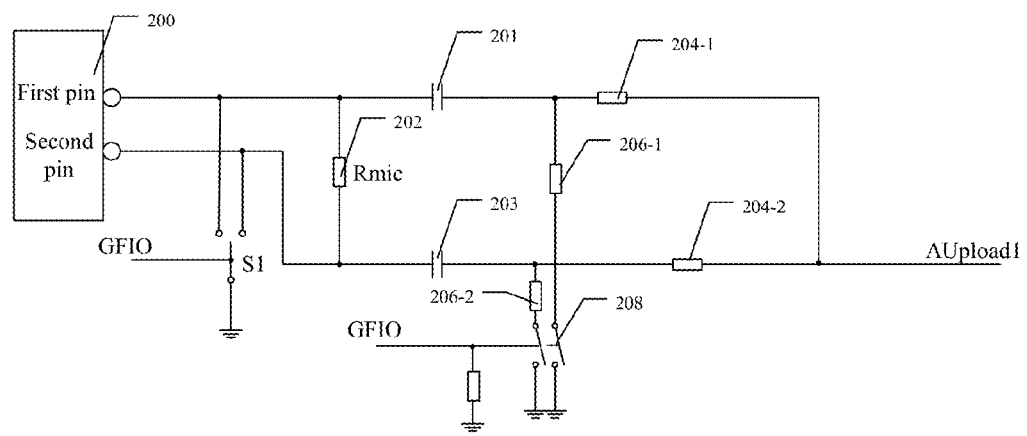
FIG. 6 is a circuit structure diagram illustrating an audio communication channel circuit provided in a second embodiment of the present disclosure.

FIG. 6 is a circuit structure illustrating an audio communication channel circuit provided in this embodiment. In the audio communication channel circuit in the present embodiment, an analog switch 208 is added on the basis of embodiment 1. The analog switch 208 is connected between the first pull-down resistor 206-1 and the output terminal of the first audio communication channel 204-1, and between the second pull-down resistor 206-2 and the output terminal of the second audio communication channel 204-2, and configured to control the connections of the first pull-down resistor 206-1 and second pull-down resistor 206-2. In this embodiment, the normal state of the analog switch 208 is open. When the audio apparatus is inserted into the host, the GFIO inputs a high level, and the analog switch may close to connect the first pull-down resistor 206-1 and the second pull-down resistor 206-2 into the circuit.

It should be noticed that, although FIG. 6 only shows the analog switch 208 adding on the basis of FIG. 2, this shouldn't be seen as any limits. For all implementations of embodiment 1, the analog switch 208 may be added between the first pull-down resistor 206-1 and the output terminal of the first audio communication channel 204-1, and between the second pull-down resistor 206-2 and the output terminal of the second audio communication channel 204-2.

Besides, the analog switch 208 in this embodiment may be realized by a crystal diode, a MOSFET (metal-oxide-semiconductor field effect transistor), etc., without any specific limitations in the present embodiment, as long as the analog switch is capable of realizing the above normal state open and becoming closed when the audio apparatus is inserted into the host.

It should be noted that the specific alternative implementations of the pull-down resistor 206 described in embodiment 1 are also suitable for the first pull-down resistor 206-1 and the second pull-down resistor 206-2 in the present embodiment. The details will not be elaborated here.

Embodiment 3

Figure 7:
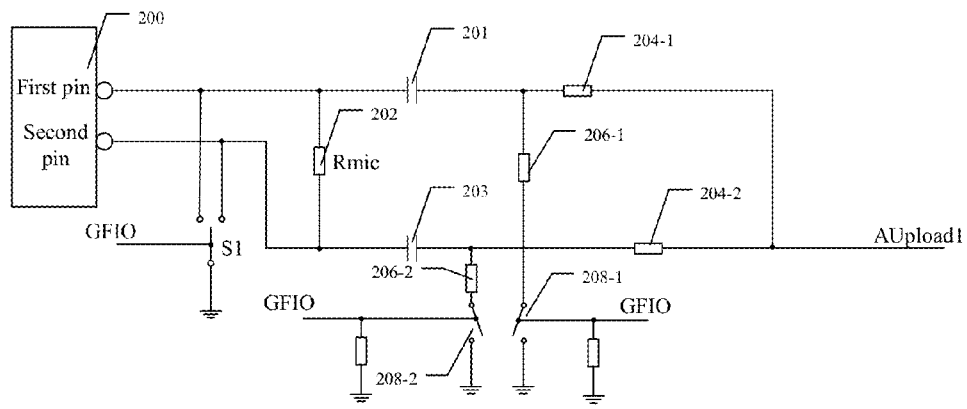
FIG. 7 is a circuit structure diagram illustrating an audio communication channel circuit provided in a third embodiment of the present disclosure.

FIG. 7 is a circuit structure illustrating an audio communication channel circuit provided in this embodiment. As shown in FIG. 7, the difference between the audio communication channel circuit in the present embodiment and in embodiment 2 is that two analog switches (i.e. an analog switch 208-1 and an analog switch 208-2) are used in the present embodiment. The analog switch 208-1 is connected between the first pull-down resistor 206-1 and the output terminal of the first audio communication channel 204-1, and the analog switch 208-2 is connected between the first pull-down resistor 206-2 and the output terminal of the first audio communication channel 204-2, so as to control the connections of the first pull-down resistor 206-1 and second pull-down resistor 206-2 separately. In this embodiment, the normal state of the analog switches 208-1 and 208-2 is open. When the audio apparatus is inserted into the host, the GFIO inputs a high level, and the analog switches 208-1 and 208-2 may close so as to connect the first pull-down resistor 206-1 and the second pull-down resistor 206-2 into the circuit.

It should be noticed that, although FIG. 7 only shows analog switches 208-1 and 208-2 adding on the basis of FIG. 2, this shouldn't be seen as any limits. For all implementations of embodiment one, the analog switches 208-1 and 208-2 may be added between the first pull-down resistor 206-1 and the output terminal of the first audio communication channel 204-1 and between the second pull-down resistor 206-2 and the output terminal of the second audio communication channel 204-2 respectively.

Besides, the analog switches 208-1 and 208-2 in this embodiment may be realized by a crystal diode, a MOSFET (metal-oxide-semiconductor field effect transistor), etc., without any specific limitations in the present embodiment, as long as the analog switch is capable of realizing the above normal state open and becoming closed when the audio apparatus is inserted into the host.

It should be noted that the specific alternative implementations of the pull-down resistor 206 described in embodiment one are also suitable for the first pull-down resistor 206-1 and the second pull-down resistor 206-2 in the present embodiment. The details will not be elaborated here.

Now taking the first pull-down resistor 206-1 and the second pull-down resistor 206-2 being independent little resistors and the audio connector 200 being a four-contact audio connector as an example, technical solutions provided in embodiments of the present disclosure will be illustrated with reference to particular examples.

Embodiment 4

Figure 8:
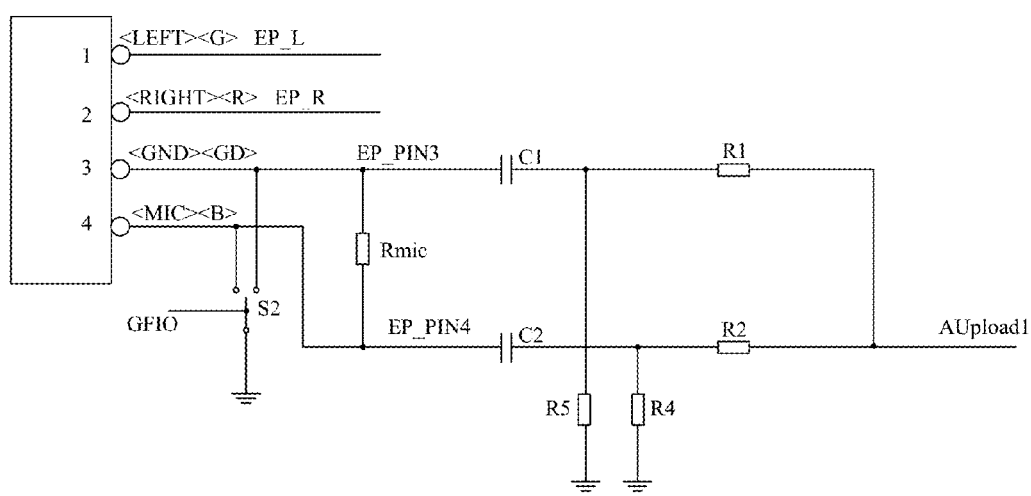
FIG. 8 is a circuit structure diagram illustrating an audio communication channel circuit provided in a fourth embodiment of the present disclosure.

The present embodiment provides an audio communication channel circuit. FIG. 8 is a circuit structure illustrating an audio communication channel circuit provided in this embodiment. As shown in FIG. 8, in the present embodiment, a connector (Earphone Plug) of the audio apparatus includes 4 pins, which are:

Pin 1: <LEFT><G> connected to an EP_L channel;
Pin 2: <RIGHT><R> connected to an EP_R channel;
Pin 3: <GND><B> connected to ground EP_PIN3 channel; and
Pin 4: <MIC><GD> connected to an audio communication channel EP_PIN4 (in practice, the positions of the <MIC>contact and the <GND> contact may be swapped with regard to different standards, i.e. pin 3 is a <MIC>contact and pin 4 is a <GND> contact, details may be found with reference to embodiment four).

As shown in FIG. 8, in this embodiment, a pull-down resistor R4 is connected to an upload output terminal of an audio signal of EP_PIN4 corresponding to pin 4 of the audio connector, and the output terminal (shown as an equivalent resistor R2 of EP_PIN4 in FIG. 8) of EP_PIN4 is connected to pin 4 via a capacitor C2; an output terminal of EP_PIN3 which corresponds to pin 3 (i.e. a contact for ground of the host) is connected to a pull-down resistor R5, and the output terminal (shown as an equivalent resistor R1 of EP_PIN3 in FIG. 8) of EP_PIN3 is connected to pin 3 via a capacitor C1. An identification circuit Rmic is provided between EP_PIN3 and EP_PIN4.

In this embodiment, the resistance value of resistors R4 and R5 is 470Ω, and the resistance value of resistors R1 and R2 is 27 kΩ.

In this embodiment, when the audio apparatus is inserted into the host, assuming that the contact connected to a MIC contact of the host is pin 4, an audio input signal (AUpload1) is input from an input terminal of channels EP_PIN3 and EP_PIN4 which are connected in parallel. Since pin 4 is connected to the MIC contact of the host, the audio signal is transmitted to the host via the audio communication channel EP_PIN4. An equivalent resistor of the connected host, the identification circuit Rmic, and the pull-down resistor R4 are connected in parallel and then may connect to R2 in series. Assuming the resistance value of the equivalent resistor of the connected host is 600Ω, the resistance value of the identification circuit 202 is 10KΩ and the voltage of the input terminal of EP_PIN4 is 3.3 V, since the resistance value (470Ω) of resistor R4 is the lowest of the three channels in parallel connection, the resistance value of the equivalent resistor of the connected host, the identification circuit Rmic and the pull-down resistor R4 which are connected in parallel is about 470Ω, therefore the voltage of the input terminal of the host is:

$$Vmic=3.3*(470/(27000+470))\approx 56.6\ mV.$$

This falls into a signal amplitude range of 9~120 mV which can be identified by the host.

If the contact connected to the MIC contact of the host is pin 3, then the audio input signal (AUpload1) is input through the input terminal of channels EP_PIN3 and EP_PIN4 which are connected in parallel. Since pin 3 is connected to the MIC contact of the host, the audio signal is transmitted to the host via the audio communication channel EP_PIN3. The equivalent resistor of the connected host, the identification circuit Rmic, and the pull-down resistor R5 are connected in parallel and then may connect to R1 in series. Assuming the resistance value of the equivalent resistor of the connected host is 600Ω, the resistance value of the identification circuit Rmic is 10KΩ, and the voltage of the input terminal of EP_PIN3 is 3.3 V, since the resistance value (470Ω) of resistor R4 is the lowest of the three channels in parallel connection, the resistance value of the equivalent resistor of the connected host, the identification circuit Rmic and the pull-down resistor R4 which are connected in parallel is about 470Ω, therefore the voltage of the input terminal of the host is:

$$Vmic=3.3*(470/(27000+470))\approx 56.6\ mV.$$

Thus it can be seen that by connecting the pull-down resistor to the output terminal of the audio communication channel, the amplitude range of audio signals input into the host may be controlled and the type of hosts that may be compatible with the audio apparatus is enlarged.

Embodiment 5

Figure 9:
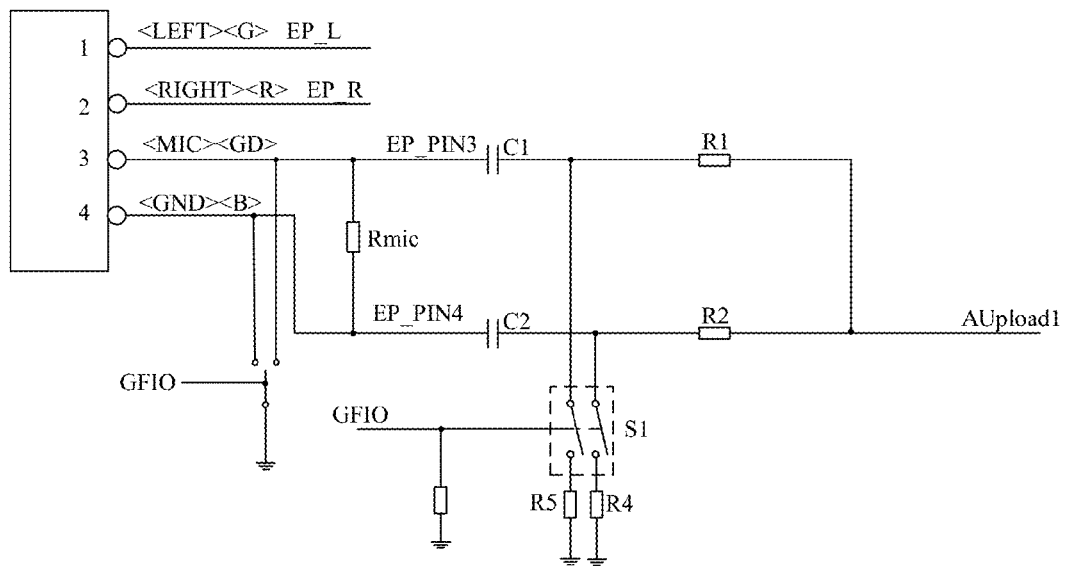
FIG. 9 is a circuit structure diagram illustrating an audio communication channel circuit provided in a fifth embodiment of the present disclosure.

The present embodiment provides an audio communication channel circuit. FIG. 9 is a circuit structure illustrating an audio communication channel circuit provided in this embodiment. As shown in FIG. 9, a difference between the present embodiment and embodiment 3 is that in the present embodiment, pin 3 of the audio connector is a <MIC> contact, and pin 4 is a <GND> contact, moreover, the present embodiment adds an analog switch 51 on the basis of embodiment 3 which is connected between an output terminal of EP_PIN3 and R5, and between an output terminal of EP_PIN4 and R4 and is configured to connect R4 and R5 into the circuit when the audio apparatus is inserted into the host.

As shown in FIG. 9, in this embodiment, the pull-down resistor R4 is connected to the upload output terminal of the audio signal of EP_PIN4 corresponding to pin 4 of the audio connector, and the output terminal (shown as an equivalent resistor R2 of EP_PIN4 in FIG. 9) of EP_PIN4 is connected to pin 4 via a capacitor C2; the output terminal of EP_PIN3 which corresponds to pin 3 (i.e. a ground contact of the host) is connected to the pull-down resistor R5, and the output terminal (shown as an equivalent resistor R1 of EP_PIN4 in FIG. 9) of EP_PIN3 is connected to pin 3 via a capacitor C1. An identification circuit Rmic is provided between EP_PIN3 and EP_PIN4.

In this embodiment, the resistance value of resistors R4 and R5 is 470Ω, and the resistance value of resistors R1 and R2 is 27 kΩ.

In this embodiment, when the audio apparatus is inserted into the host, S1 is closed. Assuming that a contact connected to a MIC contact of the host is pin 4, the audio input signal (AUpload1) is input from an input terminal of channels EP_PIN3 and EP_PIN4 which are connected in parallel. Since pin 4 is connected to the MIC contact of the host, the audio signal is transmitted to the host via the audio communication channel EP_PIN4. An equivalent resistor of the connected host, the identification circuit Rmic and the pull-down resistor R4 are connected in parallel and then may connect to R2 in series. Assuming the resistance value of the equivalent resistor the connected host is 600Ω, the resistance value of the identification circuit Rmic is 10KΩ, and the voltage of the input terminal of EP_PIN4 is 3.3 V, since the resistance value (470Ω) of resistor R4 is the lowest of the three channels in parallel connection, the resistance value of the equivalent resistor of the connected host, the identification circuit Rmic and the pull-down resistor R4 which are connected in parallel is about 470Ω, therefore the voltage of the input terminal of the host is:

$$Vmic=3.3*(470/(27000+470))\approx 56.6\ mV.$$

This falls into a signal amplitude range of 9~120 mV which can be identified by the host. If the contact connected to the MIC contact of the host is pin 3, when the audio apparatus is inserted into the host, S1 is closed, then the audio input signal (AUpload1) is input from the input terminal of channels EP_PIN3 and EP_PIN4 which are connected in parallel. Since pin 3 is connected to the MIC contact of the host, the audio signal is transmitted to the host via the audio communication channel EP_PIN3. The equivalent resistor of the connected host, the identification circuit Rmic, and the pull-down resistor R5 are connected in parallel and then may connect to R1 in series. Assuming the resistance value of the equivalent resistor of the connected host is 600Ω, the resistance value of the identification circuit is 10KΩ, and the voltage of the input terminal of EP_PIN3 is 3.3 V, since the resistance value (470Ω) of resistor R4 is the lowest of the three channels in parallel connection, the resistance value of the equivalent resistor of the connected host, the identification circuit Rmic and the pull-down resistor R4 which are connected in parallel is about 470Ω, therefore the voltage of the input terminal of the host is:

$$Vmic=3.3*(470/(27000+470))\approx 56.6\ mV.$$

Embodiment 6

An audio apparatus is provided in this embodiment.

Figure 10:
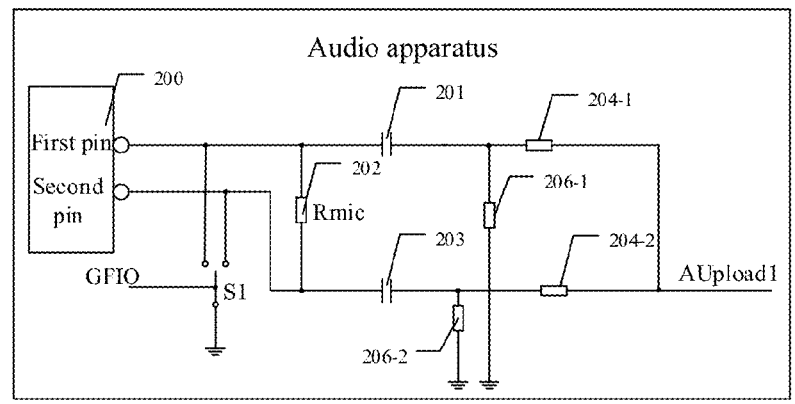
FIG. 10 is a circuit structure diagram illustrating an audio apparatus provided in a sixth embodiment of the present disclosure.

FIG. 10 is a circuit structure illustrating an audio apparatus provided in this embodiment. As shown in FIG. 10, the audio apparatus includes an audio communication channel circuit, and the audio communication channel circuit may include any one of the audio communication channel circuit in embodiment 1 to embodiment 5. In addition, the alternative implantations described in any embodiment of embodiments one to four may be adopted.

With the audio apparatus provided in the present embodiment, the resistance value of the output of the audio apparatus may be reduced by connecting the pull-down resistor to the output terminal of the audio communication channel of the audio apparatus, thus the amplitude of the signal input into the host may be controlled in a certain range, and the compatibility of the audio apparatus is enlarged.

It should be noted that in the description of the present invention, unless specified or limited otherwise, the terms "mounted," "connected," "coupled" and the like are used broadly, and may be, for example, fixed connections, detachable connections, or integral connections; may also be mechanical or electrical connections; may also be direct connections or indirect connections via intervening structures; may also be inner communications of two elements. The particular meanings of above terms can be understood by those skilled in the art according to specific situations.

Reference throughout this specification to "an embodiment", "some embodiments", "an example", "a specific example", or "some examples" means that a particular feature, structure, material, or characteristic described in connection with the embodiment or example is included in at least one embodiment or example of the present disclosure. In this specification, exemplary descriptions of aforesaid terms are not necessarily referring to the same embodiment or example Furthermore, the particular features, structures, materials, or characteristics may be combined in any suitable manner in one or more embodiments or examples.

Although embodiments of present disclosure have been shown and described above, it should be understood that above embodiments are just explanatory, and cannot be construed to limit the present disclosure, for those skilled in the art, changes, alternatives, and modifications can be made to the embodiments without departing from spirit, principles, and scope of the present disclosure. The scope of the present disclosure is limited by the attached claims and its equivalents.

What is claimed is:

1. An audio communication channel circuit of an audio apparatus comprising an audio connector, an identification circuit, a first audio communication channel and a second audio communication channel, wherein, an output terminal of the first audio communication channel is connected to one of a first pin and a second pin of the audio connector via a first capacitor, an output terminal of the second audio communication channel is connected to the other one of the first pin and the second pin of the audio connector via a second capacitor, a first terminal of the identification circuit is connected to one of the first pin and the second pin, and a second terminal of the identification circuit is connected to the other one of the first pin and the second pin; the audio communication channel circuit is characterized in further comprising:

a first pull-down resistor with a first terminal connected to an output terminal of the first audio communication channel and a second terminal connected to ground; and a second pull-down resistor with a first terminal connected to an output terminal of the second audio communication channel and a second terminal connected to ground, wherein, a resistance value of the first pull-down resistor and a resistance value of the second pull-down resistor are in a preset range, the first pin is one of a pin corresponding to a microphone (MIC) contact of a host and a pin corresponding to a ground (GND) contact of the host when the audio apparatus is connected to the host, and the second pin is the other one of the pin corresponding to the MIC contact of the host and the pin corresponding to the GND contact of the host when the audio apparatus is connected to the host.

2. The audio communication channel circuit according to claim 1, wherein, the first pull-down resistor comprises a plurality of resistors connected in series and/or parallel, and the second pull-down resistor comprises a plurality of resistors connected in series and/or parallel.

3. The audio communication channel circuit according to claim 1, wherein, the audio connector is a four-contact audio connector, the first pin is pin 3 of the four-contact audio connector and the second pin is pin 4 of the four-contacts audio connector, or, the first pin is pin 4 of the four-contact audio connector and the second pin is pin 3 of the four-contact audio connector.

4. The audio communication channel circuit according to claim 1, wherein, the preset range is determined according to a voltage range that can be identified by a host, a resistance value of the identification circuit, a resistance value of electronic elements in the first audio communication channel, a resistance value of electronic elements in the second audio communication channel, a voltage value of signal input terminals of the first audio communication channel and a voltage value of signal input terminals of the second audio communication channel.

5. The audio communication channel circuit according to claim 1, wherein, the preset range is 100~999Ω.

6. The audio communication channel circuit according to claim 5, wherein, the preset range is 270~510Ω.

7. The audio communication channel circuit according to claim 1, further comprising: an analog switch, connected between the first pull-down resistor and the output terminal of the first audio communication channel, and between the second pull-down resistor and the output terminal of the second audio communication channel, wherein, the analog switch is open in normal state and becomes closed when the audio apparatus is connected to a host.

8. The audio communication channel circuit according to claim 1, further comprising: a first analog switch, connected between the first pull-down resistor and the output terminal of the first audio communication channel; and a second analog switch, connected between the second pull-down resistor and the output terminal of the second audio communication channel, wherein, the first analog switch and the second analog switch are open in normal state and become closed when the audio apparatus is connected to a host.

9. An audio apparatus, comprising the audio communication channel circuit, wherein the audio communication channel circuit comprises an audio connector, an identification circuit, a first audio communication channel and a second audio communication channel, wherein, an output terminal of the first audio communication channel is connected to one of a first pin and a second pin of the audio connector via a first capacitor, an output terminal of the second audio communication channel is connected to the other one of the first pin and the second pin of the audio connector via a second capacitor, a first terminal of the identification circuit is connected to one of the first pin and the second pin, and a second terminal of the identification circuit is connected to the other one of the first pin and the second pin; the audio communication channel circuit further comprises:

a first pull-down resistor with a first terminal connected to an output terminal of the first audio communication channel and a second terminal connected to ground; and a second pull-down resistor with a first terminal connected to an output terminal of the second audio communication channel and a second terminal connected to ground, wherein, a resistance value of the first pull-down resistor and a resistance value of the second pull-down resistor are in a preset range, the first pin is one of a pin corresponding to a microphone (MIC) contact of a host and a pin corresponding to a ground (GND) contact of the host when the audio apparatus is connected to the host, and the second pin is the other one of the pin corresponding to the MIC contact of the host and the pin corresponding to the GND contact of the host when the audio apparatus is connected to the host.

10. The audio apparatus according to claim 9, wherein the first pull-down resistor comprises a plurality of resistors connected in series and/or parallel, and the second pull-down resistor comprises a plurality of resistors connected in series and/or parallel.

11. The audio apparatus according to claim 9, wherein, the audio connector is a four-contact audio connector, the first pin is pin 3 of the four-contact audio connector and the second pin is pin 4 of the four-contacts audio connector, or, the first pin is pin 4 of the four-contact audio connector and the second pin is pin 3 of the four-contact audio connector.

12. The audio apparatus according to claim 9, wherein, the preset range is determined according to a voltage range that can be identified by a host, a resistance value of the identification circuit, a resistance value of electronic elements in the first audio communication channel, a resistance value of electronic elements in the second audio communication channel, a voltage value of signal input terminals of the first audio communication channel and a voltage value of signal input terminals of the second audio communication channel.

13. The audio apparatus according to claim 9, wherein, the preset range is 100~999Ω.

14. The audio apparatus according to claim 13, wherein, the preset range is 270~510Ω.

15. The audio communication channel circuit according to claim 2, wherein, the audio connector is a four-contact audio connector, the first pin is pin 3 of the four-contact audio connector and the second pin is pin 4 of the four-contacts audio connector, or, the first pin is pin 4 of the four-contact audio connector and the second pin is pin 3 of the four-contact audio connector.

16. The audio communication channel circuit according to claim 2, wherein, the preset range is determined according to a voltage range that can be identified by a host, a resistance value of the identification circuit, a resistance value of electronic elements in the first audio communication channel, a resistance value of electronic elements in the second audio communication channel, a voltage value of signal input terminals of the first audio communication channel and a voltage value of signal input terminals of the second audio communication channel.

17. The audio communication channel circuit according to claim 2, wherein, the preset range is 100~999Ω.

18. The audio communication channel circuit according to claim 17, wherein, the preset range is 270~510Ω.

19. The audio communication channel circuit according to claim 3, wherein, the preset range is determined according to a voltage range that can be identified by a host, a resistance value of the identification circuit, a resistance value of electronic elements in the first audio communication channel, a resistance value of electronic elements in the second audio communication channel, a voltage value of signal input terminals of the first audio communication channel and a voltage value of signal input terminals of the second audio communication channel.

20. The audio communication channel circuit according to claim 3, wherein, the preset range is 100~999Ω.

* * * * *